July 12, 1949.  J. J. SMITH  2,476,119
METER HANGER
Filed Sept. 22, 1947  2 Sheets-Sheet 1
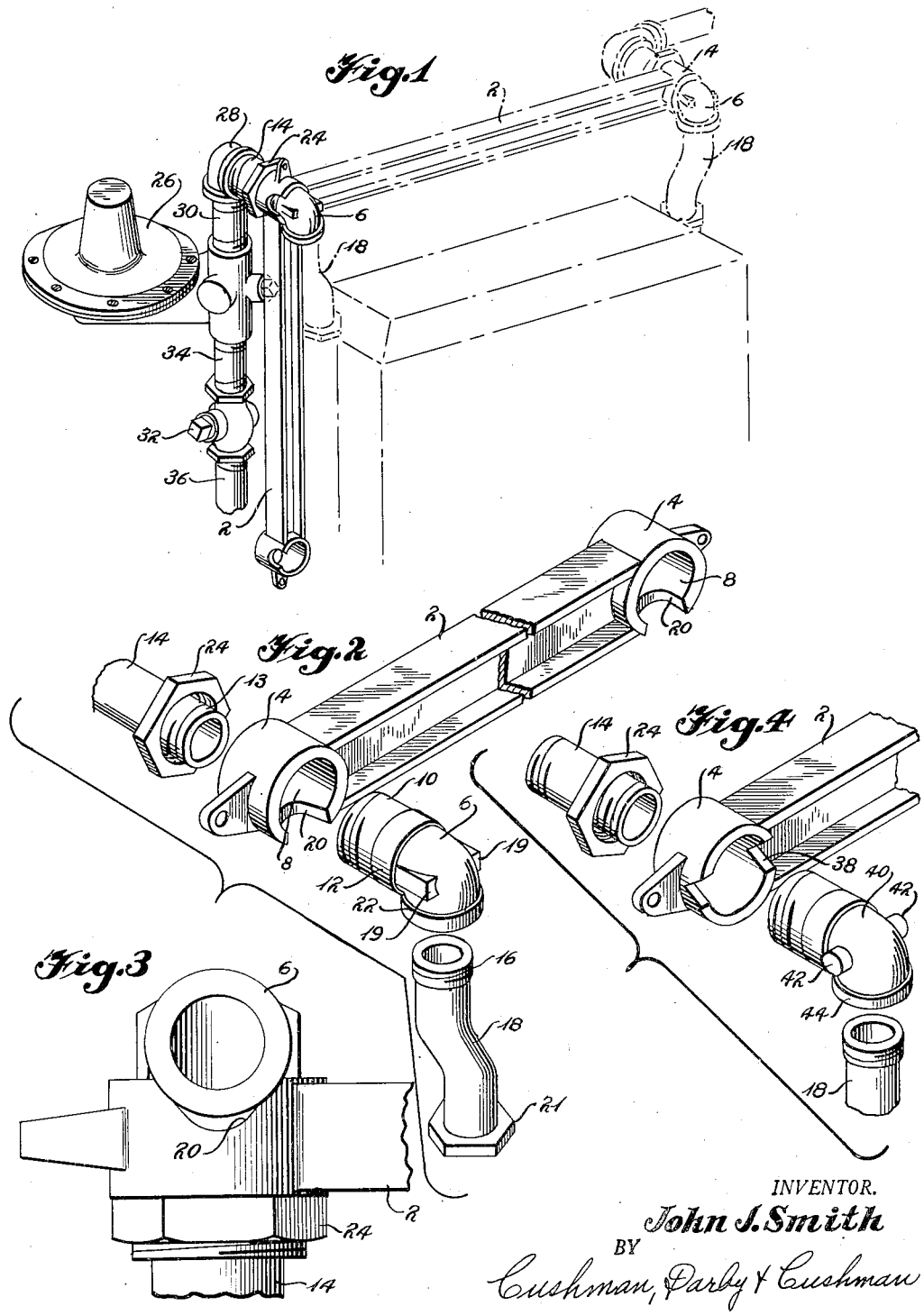
INVENTOR.
John J. Smith
BY
Cushman, Darby & Cushman
ATTORNEYS

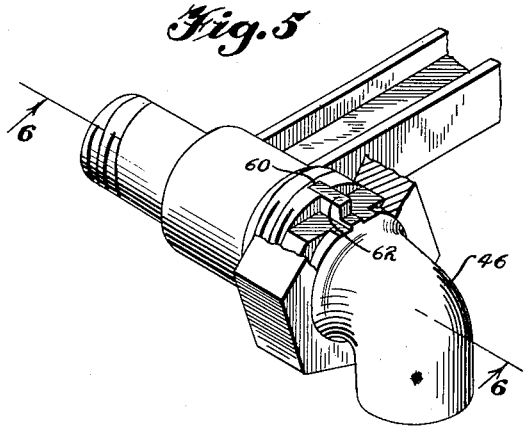
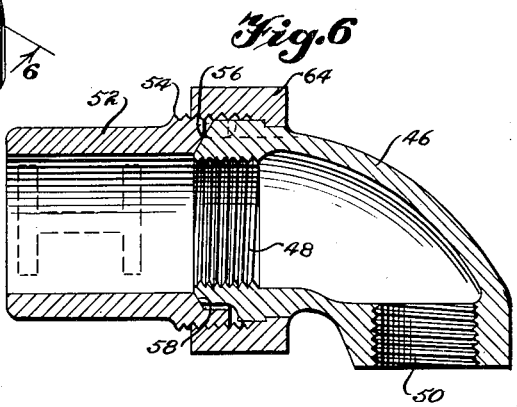
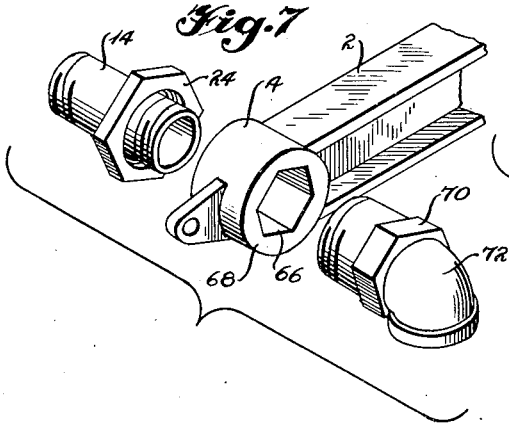
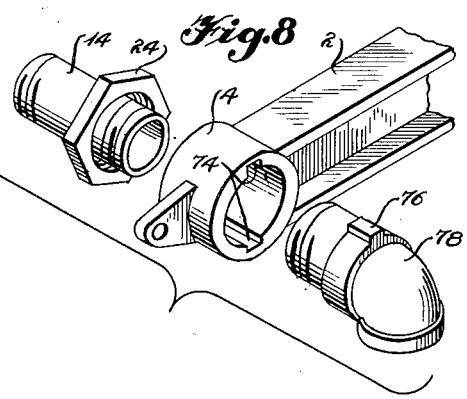

Patented July 12, 1949

2,476,119

UNITED STATES PATENT OFFICE 2,476,119

METER HANGER

John J. Smith, Decatur, Ill., assignor to Mueller Co., Decatur Ill., a corporation of Illinois Application September 22, 1947, Serial No. 775,437

9 Claims. (Cl. 285—3)

1

This invention relates to meter hangers. More particularly, it is concerned with devices for connecting meters, such as gas meters, to a pair of service pipes and for holding these pipes in rigid spaced relationship to one another so that movements of the pipes will not cause injury to the meter.

A principal object of this invention is the provision of meter hangers which will bring the top of an installed meter as near to the hanger bar as possible. Another object is the provision of meter hangers especially suited for the installation and connection of meters in dwellings or buildings which are built without cellars or basements and which have a limited vertical space within which the meter may be placed.

A further object is the provision of a new type of meter hanger construction for positioning service pipe connections in predetermined, fixed positions relative to the hanger bars and the installed meters, with the axes of bores through the ends of the meter bars positioned, so that they will be in a horizontal plane when the meter hanger is installed.

A still further object is the provision of meter hangers which are especially adapted for pre-assembly in a shop with other units used in the installation of meters, i. e., pressure regulators, valves, and the like, so that a minimum of work is required in the field for installation and connection of meters to service pipes.

Another object is the provision of meter hanger devices in which the meter is suspended in a slightly offset position below the hanger bar when completely installed.

Still further objects will become apparent from the detailed description of the structures of this invention as described below, in connection with the attached drawing in which:

Figure 1 is an isometric view of a pre-assembled meter connection assembly consisting in part of a meter hanger in accordance with this invention, showing with dotted lines the arrangement of parts of the assembly when installed with a meter;

Figure 2 is an exploded isometric view of the preferred form of my meter hangers;

Figure 3 is a view of the meter hanger of Figure 2, showing the appearance of the unit as viewed from below when in assembled position;

Figure 4 is an isometric exploded view of another form of my meter hangers;

Figure 5 is an isometric view, partly in section, of another form of my meter hangers;

Figure 6 is a sectional side view of the meter

2 hanger shown in Figure 5 taken along the line 6—6 of Figure 5;

Figures 7 and 8 are exploded isometric views of still further forms of my meter hangers.

Referring in detail to the drawings, my meter hangers consist fundamentally of a rigid bar 2 provided at each end with tubular sections or enlarged bosses 4 and a pair of angular, tubular connectors 6. In addition, an essential portion of my meter hangers is means provided in the bosses 4 for securing the connector 6 in a fixed, predetermined position relative to the hanger bar 2. These securing means may take various forms, as illustrated by the drawings.

In the preferred form of my meter hanger, as illustrated in Figure 2, the bosses 4 are provided with openings 8 which extend therethrough. These openings are of such a size as to receive the outside threaded end 10 of the connector 6 and form a bearing for the raised collar portion 12 of the connector. Both ends of the connector 6 are provided with inside threads, those in the end 10 being adapted to receive the threaded end 13 of the service pipe 14 and those of the other downwardly turned end being adapted to receive the threaded end 16 of the meter swivel 18. The lugs 19 are wrench holds to aid in screwing the connectors onto the service pipes.

The periphery of the bosses 4 are provided at the bottom side with indentations or notches 20 which serve to embrace the circular bottom portion 22 of the connector 6 when in an assembled position and to retain the connector 6 in a predetermined position relative to the bar 2 by preventing rotation of the connector within the bore 8 of the boss 4.

The meter hangers of this invention are intended primarily for mounting meters upon supply pipes which extend horizontally just below the floor of the house. The meter hanger is installed by first slipping the coupling nut 24 over the end of the pipe 14 and this is followed by sliding the bar 2 through bore 8 over the pipe 14. The connector 6 is then screw threaded onto the pipe 14, after which the connector 6 is rigidly positioned upon the hanger bar 2 by threading the coupling nut 24 onto the inner end 10 of the connector 6, drawing the circular bottom portion 22 of the connector into engagement with the notch 20, as shown in Figure 3. Finally, the meter swivel 18 is threaded into the bottom end of the connector and swivel end 21, in turn, is connected in known fashion to the meter. A similar procedure is used to install the other service pipe (not shown) to the hanger assembly and meter.

When assembled in this fashion, my meter hanger permits the meter to be mounted with vertical or upwardly extending service pipes in a minimum of vertical space and retains all of the service connections, such as inlet pipes 14 or meter swivels 18 is a predetermined, fixed, operating position preventing stresses applied to the service pipes from being transferred to the meter with resulting possible injury thereto.

A particular advantage of my new form of meter hanger is the adaptability of the unit for pre-assembly in the fashion illustrated in Figure 1. Thus, the necessary gas regulator 26 may be coupled with the connector 6 by means of tubular connections, such as the nipple 14, L 28 and the nipple 30. Preferably, the threaded end 10 of the connector 6 should be long enough that the nut 24 may be backed off sufficiently far to permit the notch 20 to be disengaged from the bottom 22 of the connector, thus allowing the bar 2 to freely rotate about the bearing shoulder 12 of the connector. This permits a pre-assembled unit, such as shown in Figure 1, which may consist, in addition to the previously mentioned parts, of a stop cock 32 and other sections of the pipe, such as nipple 34, to be connected to a gas inlet pipe 36, even under conditions where the pipe 36 may be located so close to the wall of the building that it would not be possible to thread the end of the cock 32 upon the pipe 36 unless the bar 2 could be revolved into a position, such as shown in Figure 1.

When the pre-assembled unit comprising the regulator and meter hanger, as discussed above, has been threaded onto the gas inlet pipe 36, the bar 2 is raised into a horizontal position as shown in dotted lines in Figure 1 and the meter finally installed through meter swivels 18 in the manner described above.

The alternate form of my meter hanger shown in Figure 4 is fundamentally the same as the structure shown in Figure 2, except that the connector retaining means in this case consists of two V-shaped notches 38 in place of the circular, single notch 20 in each boss 4 of the bar 2. Furthermore, the connector 40 in this case is provided with two integral pins 42 which engage the notches 38 when in assembled position, so that the connector 40 is held in a rigid position with the bottom end 44 of the connector positioned perpendicular to the bar 2.

The modification illustrated in Figures 5 and 6 provides a form of my meter hangers in which the angular, tubular connector possesses no outside threads. In this form, there is provided a connector 46 having inside threaded ends 48 and 50. The boss 52 in this case is provided at one side with outside threaded section 54 while the outside end 56 of the boss is flared and is designed to receive a fitted tapered end 58 on the connector 46. This end of the boss 52 is also provided with a notch 60 into which the lug 62 of the connector 46 fits. A coupling nut 64 serves to engage the connector 46 with the boss 52 and to hold the parts of the hanger in assembled position.

The indentations in the bosses 4 of the bars 2 which serve to engage protrusions on the angular connectors may take still other forms, as illustrated by the structures shown in Figures 7 and 8. Thus, in Figure 7, the boss 4 is provided with a polygonal opening 66 in the end 68 of the boss which receives a corresponding polygonal shoulder 70 provided on the connector 72. When in assembled position, the leading edge of the polygonal shoulder 70 engages the matched polygonal opening 66 of the bore in the boss 4 and, in cooperation with the coupling nut 24 holds the connector 72 in a fixed position within the bar 2.

In the still further modified form shown in Figure 8, the means for holding the connector in fixed position consists of two notches 74 which receive the corresponding lugs 76 on the connector 78 and when in assembled position hold the connector 78 in a predetermined position relative to the bar 2 and prevent rotation of the connector within the boss.

I claim:

1. A device for connecting a meter to a pair of service pipes and for holding the pipes in rigid spaced relationship to one another which comprises a rigid bar, a pair of angular, tubular connectors having inside threaded sections at both ends, a tubular section at each end of said bar to receive an end of one of said angular connectors and the tubular sections being provided with means which interlock with corresponding protrusions on said angular connectors to fasten said connectors in fixed, predetermined position relative to said bar within said tubular sections preventing rotation of said connectors.

2. A meter hanger for connecting a meter to service pipes and spacing the service pipes comprising a rigid bar, an enlarged boss at each end of the bar, a pair of angular, tubular connectors having inside threaded sections at both ends, bores through said bosses to receive the ends of said angular connectors and notches in said bosses to receive matching portions of said angular connectors for holding said connectors in a fixed, predetermined position.

3. A meter hanger for connecting a meter to service pipes within a minimum of vertical space comprising a bar, a boss on each end of the bar, a pair of angular, tubular connectors, circular holes through said bosses to receive the ends of the tubular connectors, and notched-out portions in the bosses adapted for embracing a portion of said connectors to hold said connectors against rotation within said holes in a fixed, predetermined position.

4. A gas meter hanger comprising a rigid bar, an enlarged boss at each end of the bar, a pair of L-shaped, tubular connectors having an inside threaded section at both ends and an outside threaded section at one end, bores through said bosses through which the outside threaded sections of said connectors may extend, notches in the peripheries of the bosses adapted to embrace integral portions of said connectors offset from the central axis, the outside threaded end of the connectors and coupling nuts adapted to screw-thread upon said outside connector threads to fasten said connectors within said bosses with said notches embracing said connector offsets preventing any rotation of the connectors within the bosses.

5. A meter hanger comprising a bar, a pair of L-shaped, tubular connectors having inside threaded sections at both ends and an outside threaded section at one end, an enlarged boss on each end of the bar, a bore through each of said bosses to receive the outside threaded ends of said connectors, a notch in each of the bosses adapted to embrace a portion of said connectors extending from said connectors perpendicular to the central axis of the outside threaded section of said connectors, and coupling nuts for screwing upon the outside threaded section of said connectors to retain the connectors within said bosses, with said extending connector portions engaging said notches whereby said connectors are held in a fixed, predetermined position against rotation within said boss.

6. A gas meter hanger comprising a rigid bar adapted for horizontal mounting, an enlarged boss at each end of the bar, a pair of L-shaped, tubular connectors each provided with inside threads in their two ends and outside threads on one end, bores through said bosses with the bore axes placed relative to the bar so that they will be horizontal when the bar is installed, said bores being adapted to receive said outside threaded ends of said connectors, notches in said bosses, protrusions on said connectors adapted to extend into said notches and coupling nuts adapted to screw upon said outside threaded connector sections.

7. A gas meter hanger comprising a rigid bar, an enlarged boss at each end of the bar, a pair of L-shaped, tubular connectors having an inside threaded section at both ends and an outside threaded section at one end, bores through said bosses through which the outside threaded sections of said connectors may extend, a semicircular notch in the edge of each boss adapted to embrace the non-outside-threaded end of said connector, the plane of said notch being parallel to the major axis of said bar, and a pair of coupling nuts adapted to screw-thread upon said outside connector threads whereby said connectors may be fastened in fixed, predetermined position in said openings.

8. A gas meter hanger comprising a rigid bar, an enlarged boss at each end of the bar, a bore through each boss, an outside threaded section on one end of each boss, a pair of L-shaped, tubular connectors having inside threads in each end, a tapered edge on one end of said connectors, a flared edge on said threaded end of said boss adapted to receive said connector taper, a lug on said tapered ends of the connector and a notch in said flared boss end adapted to receive said lug.

9. A gas meter hanger comprising a rigid bar, an enlarged boss at each end of the bar, a pair of L-shaped, tubular connectors having an inside threaded section at both ends and an outside threaded section at one end, an opening through each boss through which the outside threaded end of said connectors may extend, said openings being circular at one end and polygonal at the other end, polygonal shoulders on said connectors sized to fit said polygonal opening and coupling nuts adapted to screw-thread upon said outside connector threads whereby said connectors may be fastened in fixed, predetermined position in said openings.

JOHN J. SMITH.

REFERENCES CITED

The following references are of record in the file of this patent:

UNITED STATES PATENTS

| Number | Name | Date |
| --- | --- | --- |
| 1,847,606 | Ford | Mar. 1, 1932 |